(12) United States Patent
He

(10) Patent No.: US 8,052,058 B2
(45) Date of Patent: Nov. 8, 2011

(54) SCANNER FOR PRODUCT AUTHENTICATION

(75) Inventor: Duanfeng He, South Setauket, NY (US)

(73) Assignee: Symbol Technologies, Inc., Holtsville, NY (US)

(*) Notice: Subject to any disclaimer, the term of this patent is extended or adjusted under 35 U.S.C. 154(b) by 896 days.

(21) Appl. No.: 12/040,059

(22) Filed: Feb. 29, 2008

(65) Prior Publication Data

US 2009/0218391 A1   Sep. 3, 2009

(51) Int. Cl.
*G06K 7/10* (2006.01)
(52) U.S. Cl. ................. 235/462.09; 235/462.1
(58) Field of Classification Search .......... 235/462.09, 235/462.08, 462.1, 462.2
See application file for complete search history.

(56) References Cited

U.S. PATENT DOCUMENTS

| 7,309,011 B2 | 12/2007 | He |
| 2004/0023711 A1* | 2/2004 | Knapp ................. 463/17 |
| 2006/0095778 A1 | 5/2006 | He et al. |

* cited by examiner

*Primary Examiner* — Karl D. Frech

(57) ABSTRACT

A method of identifying or authenticating a product by providing an analog identification indicia including a randomized pattern of identification features on a first part of the product wherein one or more attributes of the randomized pattern of identification features correspond to an item identifier. A digital identification record is provided on a second part of the product including an encoded digital version of the item identifier. The product is viewed from two angles and confirmation of the information from both angles assures product authenticity.

22 Claims, 5 Drawing Sheets

SCANNER FOR PRODUCT AUTHENTICATION

FIELD OF THE INVENTION

The present invention relates to a system and method of authenticating a product using a combination of analog and digital identifiers including an analog identification indicia and a corresponding digital identification record.

BACKGROUND

There is an increasing concern over counterfeit products including software, music CDs, and over-the-counter and prescription drugs entering the U.S. market. Counterfeit products not only depress profits of legitimate manufactures, but consumers who unknowingly purchase counterfeit products are being misled. Because of health issues involving counterfeit drugs, this is a paramount concern of drug manufacturers and governmental agencies. The concern is exacerbated because of the ready availability of lower cost prescription drugs from Internet pharmacies and drug stores with undisclosed sources for the product they provide.

Because of governmental regulations and/or to prevent unauthorized tampering, many prescription and over-the-counter drugs are packaged in containers using tamper-resistant seals. The consumer purchasing a drug product must break or destroy the tamper-resistant seal in order to open the container and access the product. While such tamper-resistant seals effectively thwart tampering, sophisticated counterfeit drug manufacturers may manufacture containers that include a tamper-resistant seal. Thus, tamper-resistant seals do not adequately address the issue of counterfeit drugs.

Many other anti-counterfeit measures have been developed for use with other products that been prime targets for counterfeiters such as checks, CDs and DVDs. These anti-counterfeit measures attempt to prevent a counterfeit manufacturer from easily reproducing labels that bear anti-counterfeit indicia. For example, companies such as Microsoft Corporation use holograms on the packages of their software to indicate authenticity. Escher Group of Cambridge, Mass. has developed a FiberFingerprint.™. technology that can identify a piece of paper by its natural and unique fiber patterns. This enables the capability to identify a piece of paper in a way similar to identifying people through fingerprints. Tracer Technologies of Syosset, N.Y. has developed a fluorescent micro-fiber detection technology for security. The micro-fibers are randomly embedded in a plastic material which are only revealed upon illumination by UV light. AMCO of Farmingdale, N.Y. has developed visible as well as fluorescent tags that can be embedded in plastics. Other pigments that can be imbedded in an anti-counterfeit label or in a product have the capability of changing color when viewed at different angles. Such a color-changing pigment is also present in certain denominations of newly printed U.S. currency.

These anti-counterfeiting technologies make it difficult to reproduce the anti-counterfeit label component using copying or scanning techniques. However, more sophisticated counterfeiters have been known to make the investment necessary to duplicate these anti-counterfeit measures. For example, the holographic labels such as those used by Microsoft Corporation are known to have been successfully counterfeited.

U.S. Pat. No. 7,309,011 to He entitled 'Method of Authenticating Products Using Hardware Compatibility Flag' is assigned to the assignee of the present application and is incorporated herein by reference. This patent concerns a method of identifying or authenticating a product by providing an analog identification indicia including a randomized pattern of identification features on a first part of the product wherein one or more attributes of the randomized pattern of identification features correspond to an item identifier. A digital identification record is provided on a second part of the product including an encoded digital version of the item identifier. The randomized pattern of identification features of the analog identification indicia is read and decoded to generate an item identifier and the digital identification record is read and decoded to generate an item identifier. The product is deemed authentic if the item identifier from the analog identification indicia substantially matches the item identifier from the digital identification record.

United States published application 2006/0095778 to He et al, entitled 'Analog and Digital Indicia Authentication' is assigned to the assignee of the present application and is incorporated herein by reference. This published application also concerns an authentication-enabled indicia contains authentication information in a digital recording medium. Characteristics of the reflected light when the features are illuminated is used to generate an analog signature that is encoded in the recording medium. During processing the features are illuminated and a new analog signature is determined for comparison with the signature recorded in the digital recording medium.

SUMMARY

The process of generating an authentication mark disclosed in the '778 published application involves creating a label by using a base material containing analog signature taggents. An analog signature finder pattern is printed on the base material. An analog signature is created by scanning the analog authentication mark, which is defined by the analog signature finder pattern printed in the previous step, and the taggents contained within the region defined by the finder pattern. A digital signature is created using the analog signature as part of its content. A digital authentication mark, in the form of a 2D barcode, is printed, preferably next to the analog authentication mark. The combination of analog and digital authentication marks becomes the authentication mark.

It is preferable to simply the above process, and make a more streamlined manufacturing process that is more conducive to high-throughput industrial applications.

As in the above systems, a product is provided that has an analog identification indicia made up of a pattern of identification features corresponding to an item identifier. A digital identification record is provided on the product that includes an encoded digital version of the item identifier. To authenticate the product a pattern of identification features of the analog identification indicia is read to decode a first item identifier. A digital identification record is read and decoded to provide a second item identifier. Finally the authenticity is determined by comparing the first item identifier determined from the analog identification indicia to the second item identifier determined from the digital identification record.

In the exemplary system the complexity of manufacture is addressed by encoding the digital identification record into a 2D barcode that is rather precisely positioned with respect to the area designated for the analog identification indicia. This eliminates the need for a boundary definition being applied along with the analog identification indicia.

A second feature involves supporting the pattern of identification features in a substrate having a thickness for supporting the features at different levels within the substrate and then viewing the features from different angles to provide the item identifier.

An additional feature of the invention is use of a visible analog signature taggents or markers that have several advantages. Use of taggents encourages the human operator to actively participate in the detection of fraud. The human eye-brain combination is in some ways better in detecting fraud than a manmade device. By making the analog signature visible, the operator is more likely to actively pay attention to what he or she is scanning. Use of a visible analog signature also makes quality control easier. By making the visible taggents (small pieces of non-dissolvable material mixed into a base) a human operator in the manufacturing process can more easily detect if the taggents are missing or are of the wrong size or quantity. Use of the visible analog signature also makes the scanning hardware simpler. By using visible light the need for a UV illumination source is avoided. The scanner would also scan regular bar code since it would not need or use sophisticated ambient light blocking filters.

These and other objects, advantages, and features of the exemplary embodiment of the invention are described in detail in conjunction with the accompanying drawings.

BRIEF DESCRIPTION OF THE DRAWINGS

FIG. 4 is a schematic illustration of information encoded in the 2D bar code of

DETAILED DESCRIPTION

Figure 1:
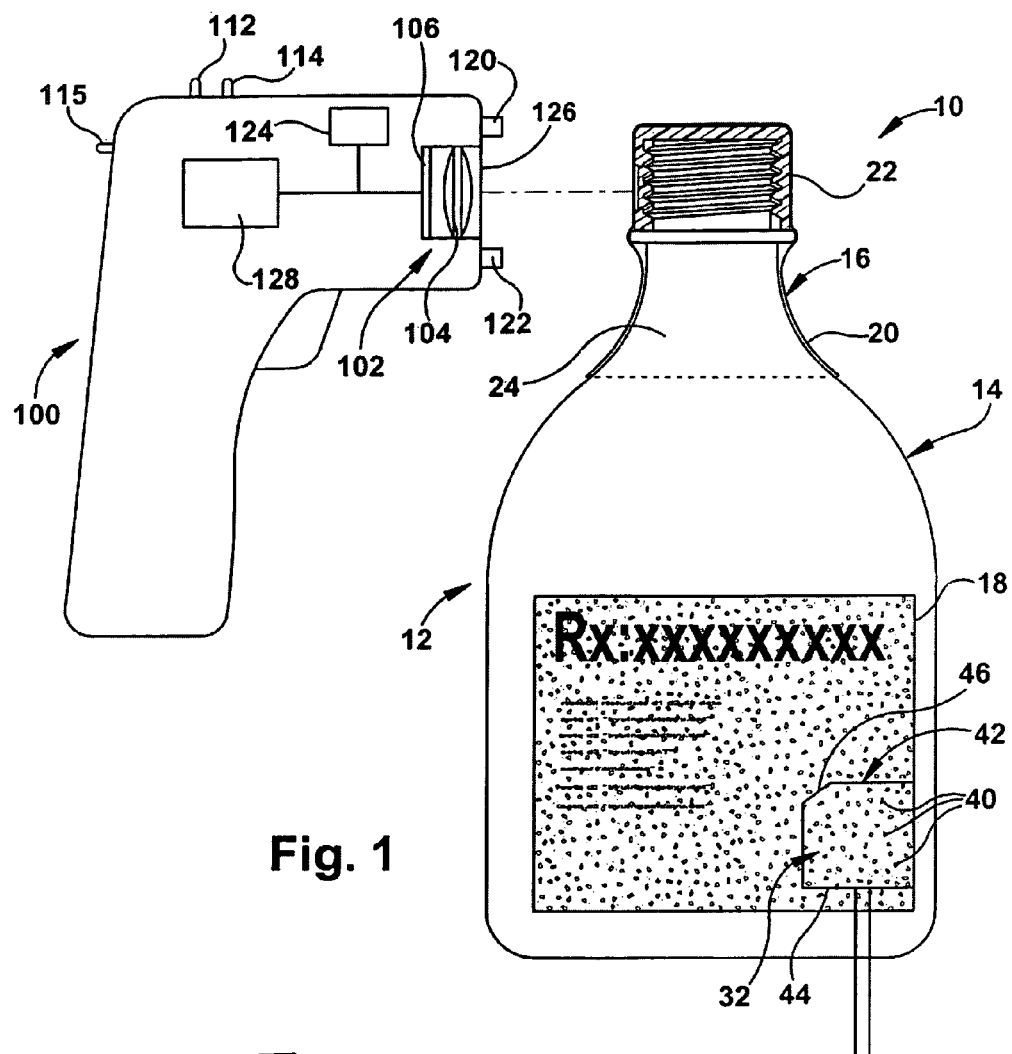
FIG. 1 is a schematic representation of a product authentication/identification system including a reader capable of imaging and decoding both analog and digital identification indicia and a product including an analog identification indicia embedded in a container label of the product and a digital identification indicia included in a 2D bar code imprinted on a tamper-resistant seal of the product.

One preferred embodiment of the identification or authentication system of the present invention is shown generally at 10 in FIG. 1. The system 10 provides a way of authenticating a product 12 using a two component authentication identifier. The system also includes a reader device 100 adapted to read and decode both components of the authentication identifier 30.

Figure 1A:
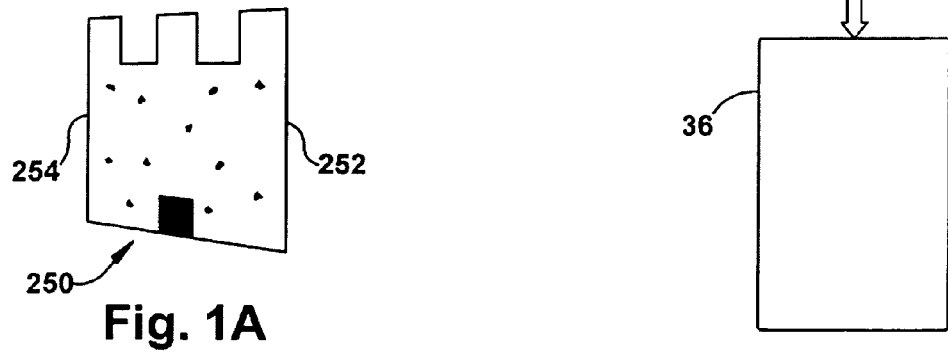
FIG. 1A is a view from the side of a region of analog identification indicia.
Figure 2:
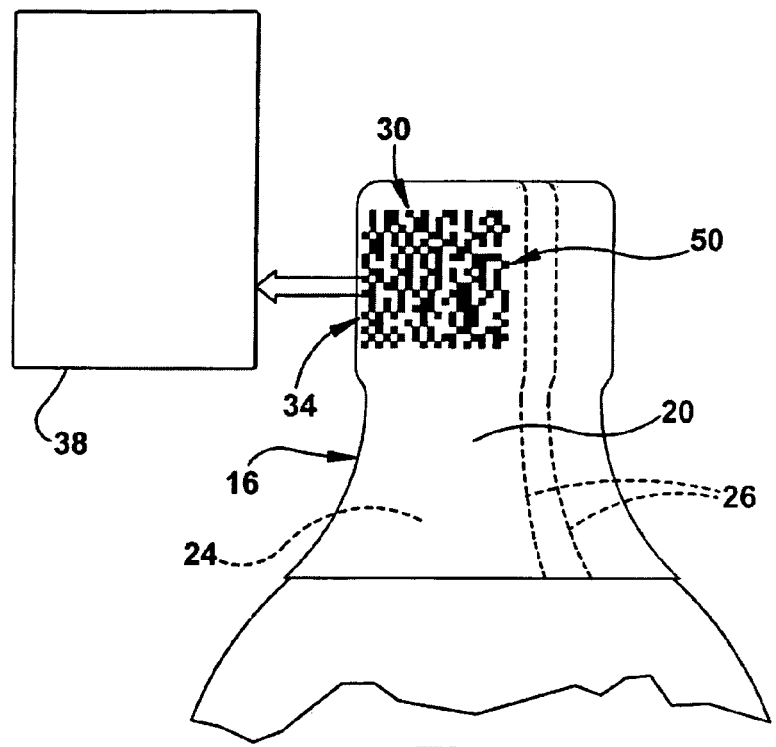
FIG. 2 is a schematic elevation view of the wrapped seal of FIG. 1.

The product 12 includes a container 14 that holds, for example, prescription medication in the form of tablets, capsules or liquid. The product container 14 includes a tamper-resistant seal 16 and a product label 18. As shown in FIGS. 1 and 1A, the seal 16 may be a plastic wrap 20 that tightly overlies a cap or top 22 of the container 14 and a shoulder portion 24 of the container below the cap 22. Typically, the seal wrap 20 includes one or more vertical lines of weakness 26 that allow a consumer to more easily remove the wrap 20 from container 14.

The product 12 includes the authentication identifier which has two components. In the embodiment of FIGS. 1 and 1A an analog identification indicia 32 forms part of the label 18 and a digital identifier or indicia such as a digital identifier record 34. The analog identification indicia 32 and the digital identification record 34 are applied or affixed to the seal 16. The analog identification indicia 32 is embodied in a random pattern 41 of identification features 40 within an area of interest 42. The digital identification record 34 is embodied in a digital pattern of a portion of a 2D bar code 50. The analog identification indicia 32, when decoded, generates an item identifier 36. Similarly, the digital identification record 34, when decoded, generates an item identifier 38.

If a comparison of the patterns comprising the item identifiers 36, 38 indicates that they match, that is, they are similar within predetermine tolerances, the product 12 is deemed authentic. During manufacture of the product 12, the item identifier 36 generated from the analog identification indicia 32 is used to encode the digital identification record 34, therefore, the item identifiers 36, 38 should be identical. However, when subsequently authenticating the product 12 in the field, the reading and decoding of the analog identification indicia 32 is prone to error because many variables that may affect the quality of the imaging.

More specifically, the analog identification indicia 32, when decoded, corresponds to or generates a sequence of numerical values referred to as the item identifier or signature 36. The numerical values of the item identifier 36 may, for example, correspond to Cartesian (x & y) coordinates of some or all of the identification features 40 within the area of interest 42 and/or reflected or emitted light intensity values of some or all of the imaged features 40 and/or other attributes of the random pattern 41. The sequence of numbers corresponding to the item identifier 36 of the analog identification indicia 32 is encoded into the digital identification record 34 of the product 12 as the product is packaged.

In FIG. 1 the two components of the authentication identifiers 30 are disposed on separable parts of the product 12. The analog identification indicia 32 is incorporated into the product label 18, while the digital identification record 34 is incorporated into the tamper-resistant seal wrap 20. Upon first opening of the product container 14, the digital identification record 34 incorporated in the seal wrap 20 is destroyed, preventing, for example, refilling the container 14 with counterfeit tablets, capsules or liquid and reselling the product 12.

The identification and authentication system 10 further includes the reader device 100, such as an imaging-based bar code reader or scanner capable of reading and decoding both the analog identification indicia 32 and the digital identification indicia 34. Generally, imaging-based bar code readers or scanners include an imaging system 102 that utilizes an imaging array such as a CCD array or a CMOS array having a plurality of photosensitive elements or pixels.

Figure 3:
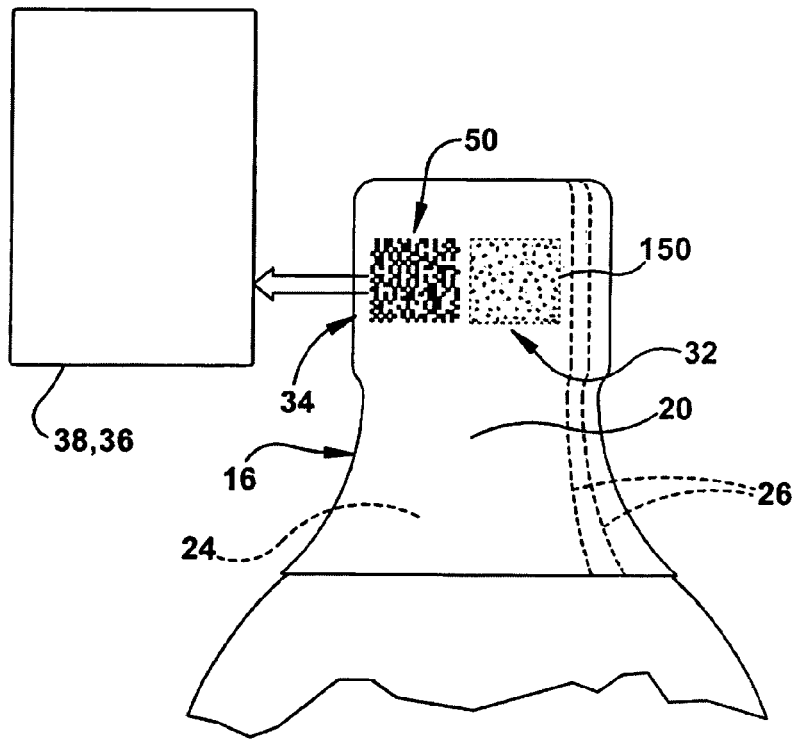
FIG. 3 is an alternate schematic elevation view of a wrapped seal having both analog and digital identification indicia.

Light reflected or emitted from a target image, e.g., a target bar code imprinted on a product label or product packaging within a field of view of the imaging system 102, is focused through a lens 104 of the imaging system onto a pixel array 106. Output signals from the pixels of the pixel array are digitized by an analog-to-digital converter 108 (FIG. 3). Decoding circuitry 110 of the device 100 processes the digitized signals and attempts to decode the imaged target, e.g., the imaged target bar code. While the shapes and relative sizes of the analog and digital identification identifiers 32, 34 are arbitrary, it is advantageous to select relative sizes that may be successfully imaged by the optics of the same reader 100 without the need for changing magnification or zooming.

One method of determining product authenticity is to use the reader device 100 to read and decode the analog identification indicia 32 and the digital identification record 34. If the two identification identifiers 32, 34 generate the same or substantially the same item identifiers 36, 38, the product 12 is determined to be authentic and a positive audio and/or visual feedback may be provided to the operator of the reader 100, e.g., illumination of a pair of green LEDs 112, 114 and/or an audible "beep" from a speaker 113 to indicate an authentic product.

Depending on the nature of the product and the desired level of security, a substantial matching, that is, some predetermined level of matching less than 100% matching of the compared patterns comprising the item identifiers 36, 38 will be deemed sufficient to determine the product 12 is authentic.

This method of authentication has the advantage of being a "stand alone" method of authentication that can be performed in the field without the necessity of communicating with a remote database. If desired, however, information from the authentication process may be communicated to a central database to permit tracing and tracking of the product 12 through its distribution system from manufacturer to consumer. The transmission of information regarding the product 12 to a central database may also include a product serial number (encoded in a payload 52 of the 2D bar code 50), the time and place that the authentication occurred, an identification number of the reader device 100, an identification number of the user/company authorized to use the reader device 100.

Analog Identification Indicia 32

Embedded in the label 18 is the analog identification indicia 32 comprising a random identification pattern. The pattern includes a plurality of spaced apart identification features or taggents 40 within the area or region of interest 42 of the label 18. To facilitate reading the region of interest 42, the region of interest 42 may be marked with an identification mark in the form of a border or outline 44, visible under normal ambient light, to define the region of interest 42 (FIG. 1A). Right angled portions of the border or outline 44 may advantageously be used as the coordinate axes for calculating the x & y coordinates of the features 40, the x & y coordinate values being part of the item identifier 36.

The use of the features 40 advantageously allows batches of label material to be produced in a normal process of making certain film or paper-like materials wherein the features would be randomly mixed in and survive intact throughout the packaging process.

The analog identification features 40 are demarcated by the outline 44 such that, while the particles may be located throughout the label 28, only the demarcated area or region of interest 42 is processed by the reader 100 to read the analog identification indicia 32.

In the FIG. 1 embodiment, the border or outline 44 includes an orientation feature 46 to indicate to the reader 100 how the analog identification features 40 should be parsed in order to match the reading orientation used for generating the digital identification record 34 and to successfully read and decode the analog identification indicia 32. Alternately, the analog identification indicia 32 may be of a type that does not require an orientation feature for successful reading and decoding. An example of such an analog identification indicia compris- ing a random pattern of identification features in the form of particles imbedded in a tamper-resistant seal or cap of a container is disclosed in U.S. application Ser. No. 10/974, 644, filed on Oct. 27, 2004 and entitled "Method of Identifying and Authenticating Products Using an Identification Pattern and Bar Code Reader." The '644 application is assigned to the assignee of the present invention and is incorporated herein in its entirety by reference.

The indicia reader 100 reads the analog identification indicia 32 and using a mathematical algorithm and/or decision rules determines the item identifier 36, that is, a numerical representation of some quality of the analog identification feature. For example, the identifier 36 may be a collection of data describing the identifiable features in the analog identification feature, such as the x-y coordinates of all or a predetermined number of features 40.

Digital Identification Record 34

In the manufacturing of the product label 18, a unique analog identification indicia 32 in the form of a random identification pattern in a region of interest 42 is generated as described above. The analog identification indicia 32, when decoded by the reader 100, generates or is transformed into the unique item identifier 36. During the manufacturing process, the item identifier 36 is then encoded to generate the digital identification record 34 which is attached to or imprinted on the product 12 for subsequent authentication. The digital identification record 34 preferably is encoded in a portion of the 2D bar code 50, such as a DataMatrix bar code.

The item identifier 36 may also be stored in a memory 124 of the reader 100. The reader memory 124 may include a file of authentic item identifiers. A record of recently read signatures, or their representations, such as hashes, may be advantageously stored for comparison to the signature currently being processed to detect duplication of a random pattern among labels in the same batch of product.

Figure 4:
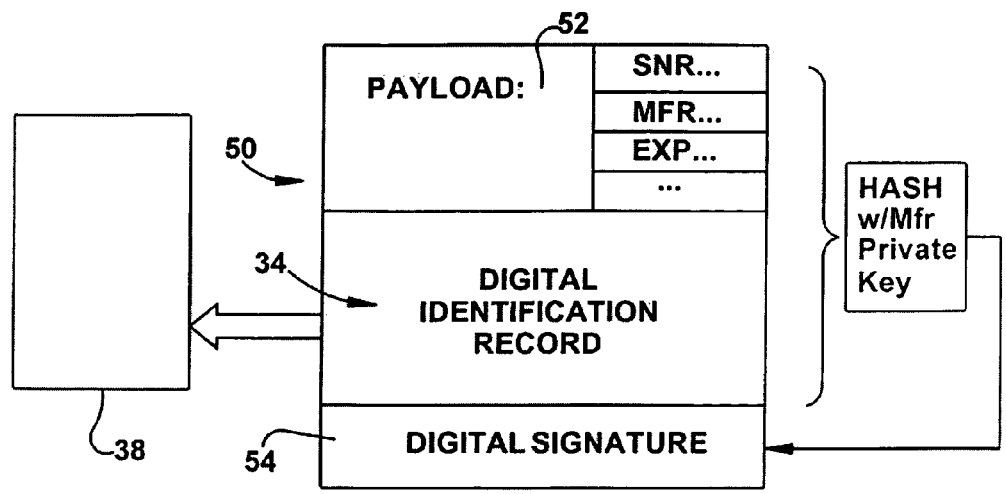
Figure 5:
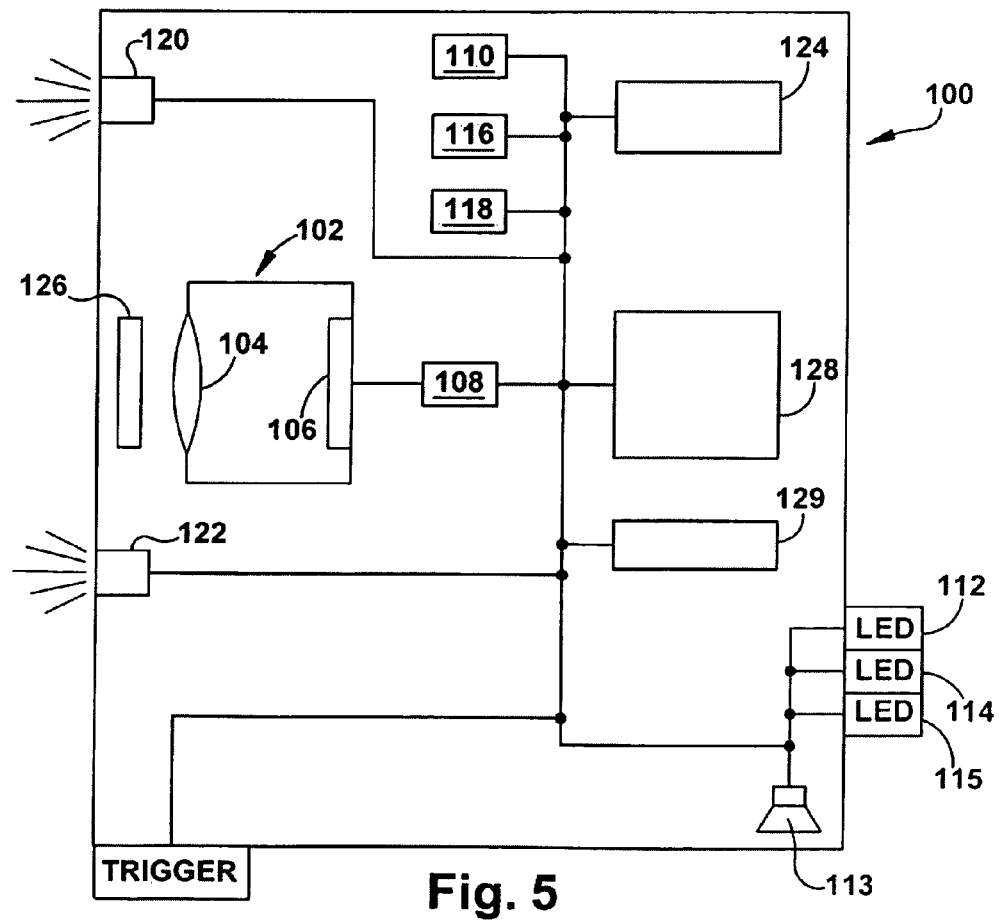
FIG. 5 is a schematic illustration of a reader capable of imaging and decoding both analog and digital identification indicia.

FIG. 4 is a schematic representation of the 2D bar code 50. The bar code 50 is digital, that is, the presence or absence of a dark area or cell is representative of a zero or one. The bar code 50 includes three encoded fields or parts: the payload 52, the digital identification record 34 which includes the encoded item identifier 38, and a digital signature 54. The data encoded in the bar code 50 is generally not encrypted, but advantageously uses error-correction to protect the reading integrity of the information it carries. Identifiers usually identify each individual field or groups of fields according to given industrial standards.

The payload 52 encodes the manufacturer's identifying and specifying information and typically includes some or all of the following information: UPC/EAN number, manufacturer, part number, lot number, serial number, and expiration date. This portion of the bar code 50 can be read and processed by standard bar code scanners or readers in those situations where authentication is deemed unnecessary.

The digital identification record 34 is tagged with an identifier similar to those used for the payload information. Encoding the digital signature 54 in the bar code 50 utilizes a technology that is widely available in e-commerce and in almost every web browser. The National Institute of Standards and Technology (www.nist.gov) maintains a standard version, which is available at no cost.

As shown in FIG. 4, the digital signature is a one-way hash of the message to which the signature is attached. In this case, the message is the information from the previous two subsections (payload 52 and digital identification record 34). The field identifiers themselves could be included as part of the message. The presence of the digital signature 54 vouches for the authenticity of the information that is used to create the signature. The signer possesses a unique number for generating the one-way hash, which is generally referred to as the secret or private key. A published related number, that is, a public key is used to verify that the digital signature 54 matches the message.

Alternate Embodiment

Figure 6:
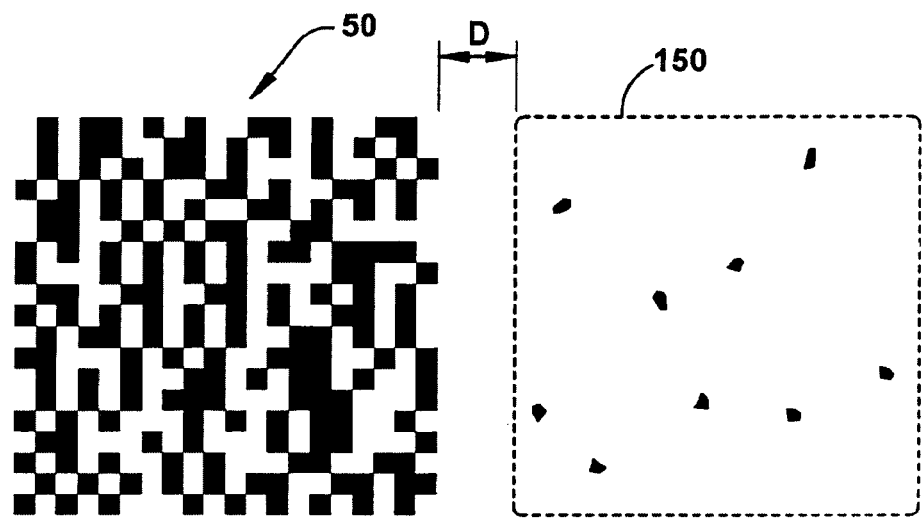
FIG. 6 is an enlarged view of the analog and digital identification indicia of FIG. 3.

An alternate and preferred embodiment the analog authentication mark needs no finder pattern such as the border or outline 44 shown on the product of FIG. 1. FIG. 6 depicts this alternate embodiment.

A 2D barcode 50 contains the digital authentication mark. This 2D barcode 50 is used to infer the orientation and size information of the analog mark so the finder pattern 44 shown in FIG. 1 is omitted. In one exemplary embodiment, an analog signature area having implied boundary 150 is defined as an area with the same physical dimension as the digital mark, that is the 2D barcode 50 and is located to the right of the bar code. separated by a distance D that is 25% the width of the digital mark. The implied bounds 150 is virtual, and during decoding, is derived from the position, size and orientation of the 2D barcode.

One necessary technical detail to enable this embodiment is that the printing equipment and the scanning equipment for reading the taggents must during manufacture have known and precise registration. Such a registration is obtained through a calibration process. It is also important to know the size of the 2D barcode to be printed, because it is used as the finder pattern for the analog mark. Generally the system must be able to handle a variable number of analog marks within the region of the analog indicia. This is likely to be different from application to the next, which may cause the number of bits of data to be digitally encoded to differ.

To achieve this flexibility it is therefore important to have a precise prior knowledge of the size of the 2D barcode even when the amount of data encoded into the barcode is not known in advance and is subject to change. The exemplary system addresses this need in at least three ways: (1) the 2D barcode's module size is adjusted so that its physical size is not changed as the amount of data it contains changes; (2) the 2D barcode has a pre-determined, and sufficiently large size; or (3) while leaving enough gap for the variable size of the 2D barcode, mark the location of the analog signature area by multiples of the unit module size of the 2D barcode, so that the exact overall size of the 2D barcode does not affect this location. To implement the second option, when the amount of information to be encoded is less than the pre-determined maximum amount, the unused data capacity is filled with padding bits, which are ignored during decoding.

Indicia Reader 100

The indicia reader shown in FIG. 1 is a hand-held imaging-based scanner or reader. However the invention can be applied to stationary readers and laser scanners as well. Utilizing its imaging system 102 and bar code decoding circuitry 110, the reader 100 may be used both to image and decode the 2D bar code 50 imprinted on a label 18 to obtain certain information and for inventory control purposes and to authenticate the product 12 by imaging and decoding the analog identification indicia 32 and comparing the item identifier 36 derived from the indicia 32 with the item identifier 38 embedded in the digital identification record 34 of the 2D bar code 50. The reader 100 images the 2D bar code 50 and decodes the digital identification record 34 to obtain the item identifier 38.

For the decoding of the analog identification pattern of taggents 40, the reader 100 includes additional pattern decoding circuitry 116, embodied either in software or hardware, such that when the area or region of interest 42 is imaged by the reader 100, the pattern decoding circuitry 116 analyzes the captured image, locates and identifies the analog identification indicia 32 by the shape of its outline 44, identifies the region of interest 42 and the identification features or particles 40 within it, ascertains the identification pattern 41 and determines the item identifier 36 for the product 12. The item identifiers 36, 38 are compared by comparison circuitry 118 of the reader 100 to decide if the identifiers 36, 38 are similar enough to conclude the product 12 is authentic.

Additional opto-electrical components may also be desired to form an aiming pattern corresponding to a field of view of the imaging assembly 102. A visible illumination is preferably provided in the form of an array of visible LEDs 120 and/or one or more visible light lasers 122.

The imaging system 102 includes the lens 104 and the sensor 106 (such as a CCD or CMOS 2-D array sensor), one or more visible LEDs 120, one or more lasers 122, a microprocessor 128, the on board memory 124, which may contain a database of public keys, and interface and support circuits 129. The interface and support circuits 129 may have wired and/or wireless communications means to a host computer or a network. It may also contain an onboard battery (not shown), and/or connections for an external power supply (not shown).

To process the authentication-enabled analog and digital identifiers 32, 34, the device 100 includes decoding and comparison software 110, 116, 118 that follows the method 400 outlined in FIG. 4 of U.S. Pat. No 7,309,011 B2. The device 100 can operate in one of several modes, allowing for varied degree of functionality depending on the capabilities of the reader 100 and its level of connectivity. The level of connectivity may be batch, where the device 100 works without a connection to a PC and either performs only the authentication task and provides audio/visual feedback for success or failure, or stores the decoded bar code results in its on-board memory 124 for downloading at a later time. Alternately, the device 100 may be connected to a computer or a wide-area-network. In this way, the decoded results can be instantly transferred, for example, for processing on a linked computer and used for tracking and tracing applications, that is, tracking and tracing the product 12 through its distribution system.

Alternate Data Capture

Figure 8:
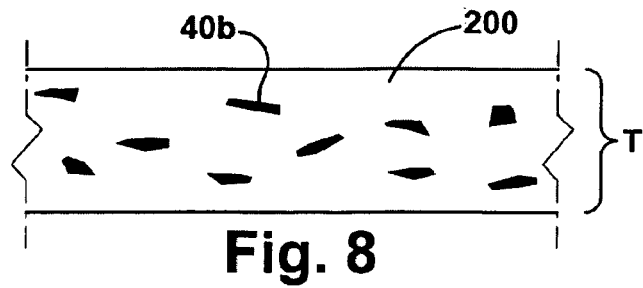
FIG. 8 is a side view of an alternate base or support material for use with the invention.
Figure 9:
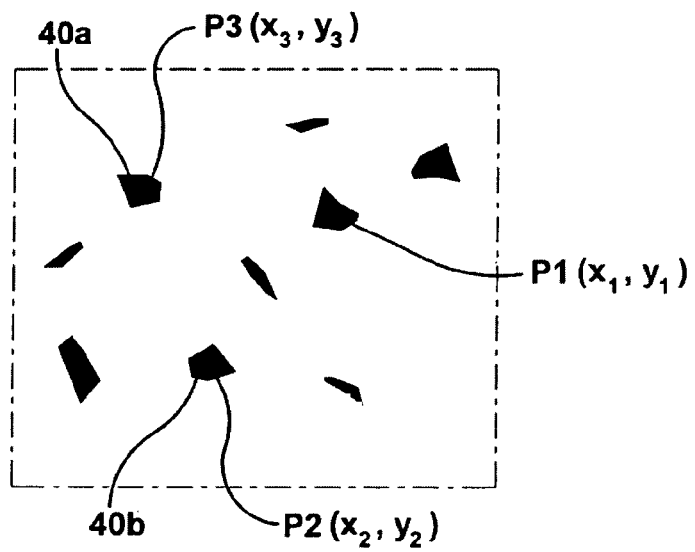
FIGS. 9 and 10 show materials embedded within the FIG. 8 base or support material seen from different angles.
Figure 10:
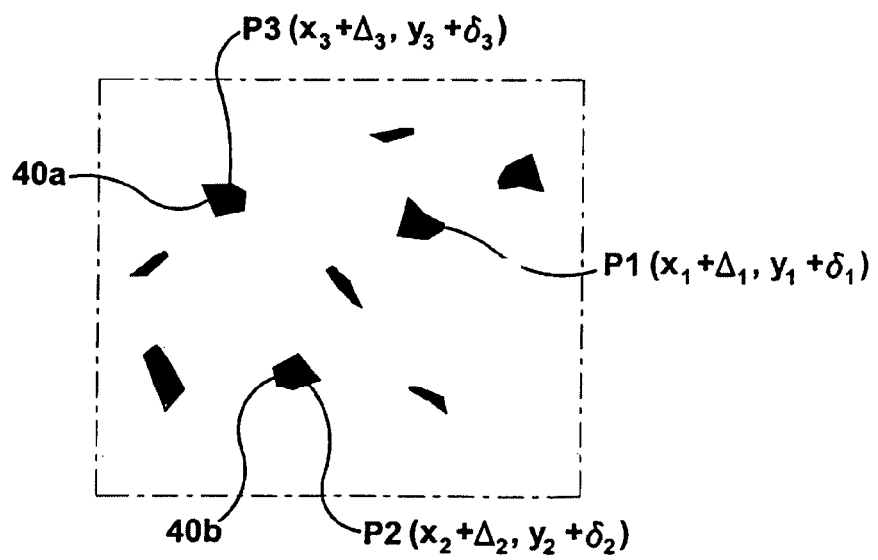

An alternate authentication system is made with a transparent plastic base material 200 having a thickness T (about 1 to 2 mm) as shown in FIG. 8. Within such a base material, visible taggents look differently depending on a viewing angle. In a preferred embodiment, the thickness of the base material is such that when coupled with a suitable imaging device a feature or parameter such as the co-ordinates of the taggent's centroid moves by two pixels or more, when the viewing angle of said imaging device is changed by 60 degrees. Alternatively, the taggent's shape, color, reflectivity or some other optical attribute can be designed to change with the angle of observation. For example, in the embodiment of FIGS. 8-10 the taggents 40 are made of thin and flat flakes; if some of them were not aligned with the material's surface, their shape and/or size would appear differently depending on the angle of observation. FIGS. 9 and 10 show the co-ordinates of a centroid of a taggent 40b shifted by an amount in both the y and x direction when viewed from different angles.

In one embodiment, the reader 100 automatically determines the angle of observation in determining the taggent parameters. The microprocessor 128 makes use of the apparent shape of the analog or digital indicia associated with the authentication mark. For example, from a generally square border image 250 such as shown in FIG. 1A, one can deduce that the picture is taken from an angle to the right of a normal direction. A visible edge boundary 252 appears longer than the edge boundary 254 when viewed from the side even though they actually the same length. More precise angle measurement can be derived mathematically, once the imaging device's camera's parameters, such as its field-of-view and number of pixels, are known. Once two or more angles are determined, the microprocessor can determine the parameters of the taggents and compare the parameters to the stored parameters previously determined. From a two view analysis, for example, the depth of the taggent within the base material 200 can be determined based on the variation of co-ordinate from the two angles. Alternatively, if the depth of each visible taggent has been determined through such observations during the manufacturing process, the apparent size/shape/location of each taggent can be determined mathematically once the viewing angle is known. In the authentication process, therefore, the scanner can determine the viewing angle of the indicia, and calculate the expected analog signature for this particular viewing angle, and compare this calculated analog signature with the actual observed data.

As noted, to use such a technology for authentication, at least two measurements from two different angles sufficiently apart must be used. The two or more measurements can be obtained from a single camera, which is moved about the object by the operator. Alternately a reader that has two cameras 210, 212 spaced, for example, by a fixed viewing separation angle of 2 θ supported within a single reader housing 214. A combination of these two techniques can also be used. In one embodiment, to enable this method of authentication, more than one measurement of the analog signature must be obtained and recorded in the digital indicia of the bar code in the digital identification record of the bar code mark. These two or more measurements can again be obtained by either multiple captures from the same camera, or multiple cameras, or a combination of both either at the same time the analog data is captured or in a separate capture sequence. In the exemplary embodiment the angle theta between the camera and a centerline 220 is about 30 degrees.

When a particular measurement obtained during authentication does not correspond to one of the measurements recorded in the digital indicia, commonly known techniques of interpolation/extrapolation can be employed to obtain a synthetic analog signature for matching with the analog signature obtained. Alternatively, in the case where multiple cameras are used in the authentication device, the device can be constructed such that it would be natural and easy to obtain multiple images of approximately the expected angles.

Figure 7:
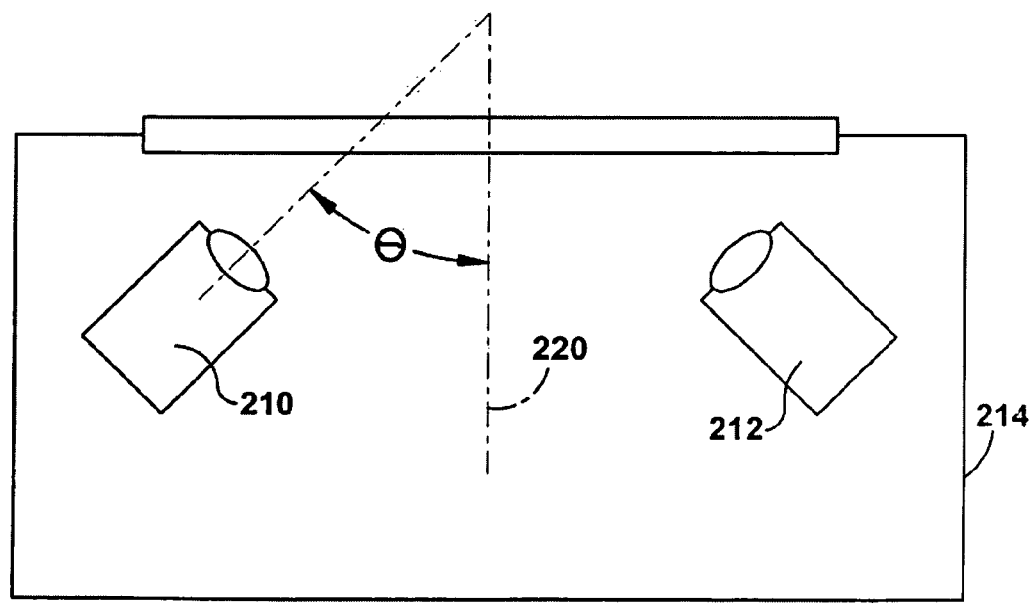
FIG. 7 is a schematic depiction of a reader having two cameras for view the indicia from different angles.

For example, as shown in FIG. 7, the device could contain two cameras in a stereo pair fashion, to facilitate taking two pictures from the left and right, and from the expected angles, when the distance to the object is correct. For a scanning device with a single camera, the device can also constantly evaluate the viewing angle of the authentication mark, and attempt to capture the most suitable image while the operator moves the device about it. It is advantageous if the printer used can print in two colors, a foreground and a background color. The background color is used to fill all areas of the background not printed with the foreground color, so that in the digital mark area the taggants are not visible through the transparent base material.

Authentication

In one embodiment the analog identification pattern within the a visible outline 44 is processed in step to decode the product identifier 36. The transformation from identification pattern features 40 to the item identifier 36 is based on one or more attributes or qualities of the features, e.g., location of features, size of features, color of features, etc. Predetermined transformation rules are followed to decode or convert the imaged identification pattern to the item identifier 36.

The device 100 attempts to find the 2D bar code 50 in the captured image. If the device 100 finds the 2D bar code 50 in the captured image, the device decoding software 110 decodes the digital identification record 34 and the digital signature 54 to determine the item identifier 38. The digital signature 54 is decoded to verify the authenticity of the digital identification record 34. The comparison software 118 then compares the two item identifiers 36, 38 to verify the authenticity of the product 12.

If the item identifiers 36, 38 are substantially identical, the product 12 is deemed authentic and success is indicated to the operator via illuminating both LEDs 112, 114 and/or the sounding of a designated success audio signal through the speaker 113, and the process ends. On the other hand, if the comparison fails, that is, the item identifiers 36, 38 are not substantially the same, failure is indicated by illuminating a red LED 115 and/or the sounding of a designated partial decode audio signal through the speaker 113.

In one embodiment, the software searches for the outline 44 of the analog identification indicia 32 in the image. If the identification mark of the analog identification indicia 32 is not found, the user is signaled. Upon use activation of the device 100, another image is acquired. The new image is searched for the outline 44 of the analog identification indicia 32.

If the verification based on the comparison of the two item identifiers 36, 38 fails, failure is indicated by illuminating the red LED 115 and/or sounding an audio tone for failure. However, if the verification succeeds, success is indicated in 470 by illuminating both green LEDs 112, 114 and/or sounding an audio tone for successful authentication.

The item identifiers 36,38 are verified with a user selectable degree of tolerance or error. The predetermined tolerance or error level may include values for both the number of features found and for their specific values. For example, if the item identifiers represent the x-y coordinates of 25 features in the identification pattern, a level of tolerance may be set such that at least 23 of the 25 features need to be identified when imaging the pattern.

The digital identification record 34 using the digital signature 54 and the manufacturer's public key. This key should be made available by the manufacturer. The key is usually obtained or verifiable through a trusted certificate agent. The key can be stored in the reader's memory 124 or on an associated computer that is accessed by wireless or hard-wired connection. Most readers have sufficient on board memory to cache a number of public keys.

Digital signatures are generally fixed for each manufacturer, with occasional changes in the event that it is retired due to special circumstances such as a merger or breach of security. It is thus generally safe to cache the key for a limited period of time. An expiration time is generally specified with the key, such as one year form the time of issuance or renewal.

The digital signature can be verified alone, without the reading of the analog identification indicia 32. This approach allows a degree of authentication to be provided without requiring hardware modifications for activating specialized features in the analog identification feature.

Alternative embodiments of the security device include using other digital media to record the same information that is recorded in the 2D bar code 50. For example, a magnetic device, or solid-state memory device (such as a memory button or a radio-frequency ID tag (RFID)) could be used.

It can be seen from the foregoing description that including a hardware compatibility flag as part of an authentication enabled label ensures that the proper stimulus is used to read the analog indicia or that the operator is alerted if the proper stimulus hardware is not available. Although the invention has been described with a certain degree of particularity, it should be understood that various changes can be made by those skilled in the art without departing from the spirit or scope of the invention as hereinafter claimed.

I claim:

1. A method of identifying or authenticating a product comprising:
   providing an analog identification indicia on the product comprising a pattern of identification features corresponding to an item identifier;
   providing a digital identification record including an encoded digital version of the item identifier;
   reading the pattern of identification features of the analog identification indicia from two or more different viewing angles to decode a first item identifier;
   reading the digital identification record and decoding a second item identifier; and
   determining authenticity of the product by comparing the first item identifier determined from the analog identification indicia to the second item identifier determined from the digital identification record.

2. The method of claim 1 wherein authenticity is confirmed by lighting a LED.

3. The method of claim 1 wherein authenticity is confirmed by sounding an audible alert.

4. The method of claim 1 wherein the digital identification record is encoded into a 2D barcode applied to a product.

5. The method of claim 4 wherein the analog identification indicia is spaced from the 2D barcode a predetermined distance.

6. The method of claim 1 wherein the reading is performed by a reader comprising two cameras for viewing the analog identification indicia from different angles.

7. The method of claim 1 wherein the pattern of identification features are supported in a substrate having a thickness for supporting the features at different levels within the substrate.

8. The method of claim 1 wherein the item identifier includes co-ordinates of a representative number of particles as viewed from the two or more angles.

9. The method of claim 8 wherein the co-ordinates are centroids of said particles.

10. The method of claim 1 wherein the item identifier includes reflectivity of a light source that bounces off a representative number of particles as viewed from the two or more angles.

11. A system for authenticating a product comprising:
   a product including i) an analog identification indicia comprising a pattern of identification features affixed to the product, the analog identification indicia including identifier features having an appearance that is altered when viewed from different angles and wherein the identifier features are encoded into an item identifier; and ii) a digital identifier including an encoded version of the item identifier; and
   an imaging device comprising i) an imaging system for generating an image of the analog identification indicia and the digital identifier; ii) circuitry for: analyzing the image of the identification features and decoding an item identifier; analyzing the image of the digital identifier and decoding an item identifier; and comparing the item identifier determined from the analog identification indicia to the item identifier determined from the digital identifier to authenticate the product.

12. The system of claim 11 wherein the digital identification record is encoded into a 2D barcode applied to a product.

13. The system of claim 12 wherein the analog identification indicia is spaced from the 2D barcode a predetermined distance.

14. The system of claim 11 wherein the imaging device comprises two cameras for viewing the analog identification indicia from different angles.

15. The system of claim 11 additionally comprising a substrate supporting the pattern of identification features and wherein the substrate has a thickness for supporting the features at different levels within the substrate.

16. The system of claim 11 wherein the item identifier is a co-ordinate of a representative number of particles as view from the two or more angles.

17. The system of claim 16 wherein the co-ordinate is a centroid of a particle.

18. Computer readable media having computer-executable instructions stored thereon for use in authenticating an analog identification indicia comprising a pattern of identification features corresponding to an item identifier with a digital identification record including an encoded digital version of the item identifier: said instructions
   reading the pattern of identification features of the analog identification indicia from two or more different angles and decoding an item identifier;
   reading the digital identification record and decoding an item identifier; and
   determining authenticity of the product by comparing the item identifier determined from the analog identification indicia to the item identifier determined from the digital identification record.

19. The computer readable media of claim 18 wherein the computer-executable instructions include the step of alerting a user.

20. A system for authenticating a product comprising:
   a product including an analog identification means comprising a pattern of identification features affixed to the product, the analog identification means including identifier features having an appearance that is altered when viewed from different angles and wherein the identifier features can be decoded to represent an item identifier;
   a digital identifier means including an encoded version of the item identifier; and
   an imaging device including one or more stimulus mechanisms and an imaging system for generating an image of the analog identification means and the digital identifier; the imaging device further including means for analyzing the image of the identification features and decoding an item identifier; analyzing the image of the digital identifier means and decoding an item identifier; and comparing the item identifier determined from the analog identification means to the item identifier determined from the digital identifier means to authenticate the product.

21. A method of authenticating a product comprising:
   providing an analog identification indicia comprising a pattern of identification features corresponding to an item identifier;
   positioning a bar code including an encoded digital version of the item identifier at a predetermined position with respect to the analog identification indicia;
   reading the digital identification record and decoding an item identifier;

reading the pattern of identification features of the analog identification indicia to decode an additional item identifier, making use of a coordinate system established from the digital identification record; and determining authenticity of the product by comparing the item identifier determined from the analog identification indicia to the item identifier determined from the digital identification record.

22. The method of claim 21 wherein the bar code is of a predetermined dimension regardless of the amount of data contained therein to define a position of the analog identification indicia.

* * * * *

UNITED STATES PATENT AND TRADEMARK OFFICE
CERTIFICATE OF CORRECTION

PATENT NO. : 8,052,058 B2
APPLICATION NO. : 12/040059
DATED : November 8, 2011
INVENTOR(S) : He Page 1 of 1

It is certified that error appears in the above-identified patent and that said Letters Patent is hereby corrected as shown below:

In Column 1, Line 65, delete "He" and insert -- He, --, therefor.

In Column 9, Line 64, delete "the a" and insert -- the --, therefor.

Signed and Sealed this
Fourth Day of December, 2012

David J. Kappos
*Director of the United States Patent and Trademark Office*